US010727696B2

(12) United States Patent
Jung et al.

(10) Patent No.: US 10,727,696 B2
(45) Date of Patent: *Jul. 28, 2020

(54) POWER CONTROL METHOD AND DEVICE IN WIRELESS POWER TRANSMISSION SYSTEM

(71) Applicant: GE Hybrid Technologies, LLC, Niskayuna, NY (US)

(72) Inventors: Chun Kil Jung, Seoul (KR); Soon Sang Kwon, Siheung-si (KR)

(73) Assignee: GE HYBRID TECHNOLOGIES, LLC, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,234

(22) Filed: Dec. 11, 2019

(65) Prior Publication Data

US 2020/0112201 A1   Apr. 9, 2020

Related U.S. Application Data

(63) Continuation of application No. 16/266,903, filed on Feb. 4, 2019, now Pat. No. 10,541,560, which is a
(Continued)

(30) Foreign Application Priority Data

Nov. 15, 2013 (KR) .......................... 10-2013-0139258

(51) Int. Cl.
*H02J 7/00* (2006.01)
*H02J 50/10* (2016.01)
(Continued)

(52) U.S. Cl.
CPC .......... *H02J 50/10* (2016.02); *H02J 7/00036* (2020.01); *H02J 7/0071* (2020.01); *H02J 50/40* (2016.02); *H02J 50/80* (2016.02)

(58) Field of Classification Search
CPC ....................................................... H02J 50/10
(Continued)

(56) References Cited

U.S. PATENT DOCUMENTS 8,421,407 B2 * 4/2013 Johnson ................ H02J 7/0044
320/108
10,236,719 B2    3/2019 Jung et al.
(Continued)

FOREIGN PATENT DOCUMENTS

JP    2013172499    9/2013
JP     201028934    1/2018
(Continued)

OTHER PUBLICATIONS

"International Search Report dated Feb. 17, 2015, issued to International Application No. PCT/KR2014/010952", Feb. 17, 2015, 4 pages.
(Continued)

*Primary Examiner* — Yalkew Fantu
(74) *Attorney, Agent, or Firm* — DeLizio Law, PLLC

(57) ABSTRACT

The present invention relates to a power control method and device in a wireless power transmission system. According to the present invention, even if a CEP packet is not transmitted from a wireless power reception device over a certain period of time, a wireless power transmission device may additionally determine whether the wireless power reception device is located in a charging area and sustainably perform charging.

16 Claims, 6 Drawing Sheets

Related U.S. Application Data continuation of application No. 15/844,624, filed on Dec. 18, 2017, now Pat. No. 10,236,719, which is a continuation of application No. 15/036,689, filed as application No. PCT/KR2014/010952 on Nov. 14, 2014, now Pat. No. 9,871,400.

(51) Int. Cl.
*H02J 50/80* (2016.01)
*H02J 50/40* (2016.01)

(58) Field of Classification Search
USPC ........................................................ 320/108
See application file for complete search history.

(56) References Cited

U.S. PATENT DOCUMENTS

| | | | |
|---|---|---|---|
| 2010/0207771 A1* | 8/2010 | Trigiani | B60L 11/1816 340/636.1 |
| 2012/0256585 A1* | 10/2012 | Partovi | H02J 7/0044 320/108 |
| 2013/0106364 A1 | 5/2013 | Baarman et al. | |
| 2014/0111153 A1* | 4/2014 | Kwon | H02J 5/005 320/108 |
| 2016/0372956 A1 | 12/2016 | Jung et al. | |
| 2019/0190316 A1 | 6/2019 | Jung et al. | |

FOREIGN PATENT DOCUMENTS

| | | |
|---|---|---|
| KR | 10-2012-0132225 | 12/2012 |
| KR | 10-2013-0081812 | 7/2013 |
| WO | 2015072777 | 5/2015 |

OTHER PUBLICATIONS

"Qi System Description Wireless Power Transfer", Wireless Power Consortium, vol. 1:Low Power, Part 1:Interface Definition, Version 1.0.1, Oct. 2010, 88 pages.
"U.S. Appl. No. 15/844,624 Final Office Action", dated Sep. 10, 2018, 8 pages.
"U.S. Appl. No. 15/844,624, Office Action", dated Jan. 30, 2018, 6 pages.
"U.S. Appl. No. 16/266,903 Office Action", dated May 31, 2019, 7 pages.

* cited by examiner

POWER CONTROL METHOD AND DEVICE IN WIRELESS POWER TRANSMISSION SYSTEM

RELATED APPLICATIONS

This application is a Continuation of and claims the priority benefit of U.S. application Ser. No. 16/266,903, filed Feb. 4, 2019, which is a Continuation of and claims the priority benefit of U.S. application Ser. No. 15/844,624, filed Dec. 18, 2017, which is a Continuation of and claims the priority benefit of U.S. application Ser. No. 15/036,689 filed May 13, 2016, which is a National Stage Entry of International Patent Application Serial No. PCT/KR2014/010952, filed Nov. 14, 2014, which claims the priority benefit of Korean Patent Application No. 10-2013-0139258, filed Nov. 15, 2013, the disclosures of which are incorporated herein by reference.

TECHNICAL FIELD

The present invention relates to a wireless power transmission, and more particularly, to a power control method and device in a wireless power transmission system.

BACKGROUND ART

In general, in order to charge portable terminals such as a cellular phone, a notebook, and a personal digital assistant (PDA), the portable terminals should receive electric energy (alternatively, power) from an external charger. The portable terminals include a battery cell storing the supplied electric energy and a circuit for charging and discharging (supplying the electric energy to the portable terminals) the battery cell.

An electrical connection mode between the charger for charging the electric energy in the battery cell and the battery cell include a terminal supply mode that receives commercial power and converts the received commercial power into voltage and current that correspond to the battery cell to supply the electric energy to the battery cell through a terminal of the corresponding battery cell.

The terminal supply mode is accompanied by the use of a physical cable or electric wire. Therefore, when a lot of terminal supply mode apparatuses are handled, a lot of cables occupy a significant workspace and are difficult to arrange and external appearance is also not good. Further, the terminal supply mode may cause an instantaneous discharge phenomenon due to different potential differences among terminals, occurrence of damage and fire by foreign substances, natural discharge, deterioration of life-span and performance of a battery pack, and the like.

Recently, in order to solve the problems, a charge system (hereinafter, referred to as a wireless power transmission system) and control methods using the wireless power transmission mode has been presented. The wireless power transmission mode is also referred to as a contactless power transmission mode or a non-contact power transmission mode. The wireless power transmission system includes a wireless power transmission device that supplies the electric energy in the wireless power transmission mode and a wireless power reception device that receives the electric energy wirelessly supplied from the wireless power transmitting device to charge the battery cell.

In the terminal supply mode, a power transmission is performed through the terminal connection between a charger and a terminal, and the power transmission is stopped when the terminal is disconnected from the charger. On the other hand, the wireless power transmission system requires a coupling (magnetic induction and/or magnetic resonance) between the primary coil provided in a charger and the secondary coil provided in a terminal for charging owing to the non-contact charging characteristics, and the charger always transmits power to the terminal through the magnetic coupling. When performing a wireless power transmission by a charger in the wireless power transmission system, the charger should be able to stop the power transmission by detect the terminal to be removed from a charging area. As an example, a terminal may transmit a packet such as a control error packet indicating that the corresponding terminal is located in a charging area (or interface surface) to a charger, and the charger may determine the corresponding terminal to be removed from the charging area when the control error packet is not received for a predetermined period (e.g., 1.8 sec). However, when a terminal performs a battery charge through the wireless power reception, in some cases, serious load fluctuation may occur in the terminal (hereinafter, this is referred to a light load state), and owing to this, a distortion may occur in the packet transmitted to a charger from the terminal. In this case, although the terminal is located in a charging area, a problem occurs that the charger determines the terminal to be removed from the charging area and terminates the power transmission.

DISCLOSURE

Technical Problem

An object of the present invention is to provide a power control method and device in a wireless power transmission system.

Another object of the present invention is to a power control method and device in a wireless power transmission system in which a light duty state of a wireless power reception device is considered.

A yet another object of the present invention is to propose an interpretation standard for the case that a wireless power transmission device receives a distort signal in a wireless power transmission system.

A yet another object of the present invention is to propose a standard for detecting whether a wireless power reception device is removed from a charging area in a wireless power transmission system.

Technical Solution

In an aspect, a wireless power transmission device performing a power control is provided. The device includes at least one primary coil configured to be coupled with at least one secondary coil provided in a wireless power reception device located in a charging area and configured to transmit wireless power, a communication unit configured to receive a signal including a control error packet (CEP) from the wireless power reception device through the primary coil and to decode the signal, and a control unit configured to drive a CEP timer for checking whether the CEP is received within a predetermined period, and to count an interrupt generated when decoding the signal received through the primary coil, and the control unit controls transmission and stop of wireless power to the wireless power reception device through the primary coil based on the CEP timer and the interrupt count, and initializes the CEP timer when the communication unit receives the CEP.

In another aspect, a wireless power transmission method by a wireless power transmission device performing a power control is provided. The method includes transmitting wireless power to a wireless power reception device located in a charging area through at least one primary coil, receiving a signal including a control error packet (CEP) carrying power control related information from the wireless power reception device through the primary coil, driving a CEP timer for checking whether the CEP is received within a predetermined period, counting an interrupt generated when decoding the signal received through the primary coil, and controlling transmission and stop of wireless power to the wireless power reception device through the primary coil based on the CEP timer and the interrupt count, and the CEP timer is initialized when the CEP is received.

Technical Effects

According to the present invention, even though a CEP packet is not transmitted for a predetermined period from a wireless power reception device, a wireless power transmission device may additionally determine whether the wireless power reception device is located in a charging area and continuously perform charging.

BEST MODE FOR INVENTION

The term of "wireless power" is used to denote the energy of arbitrary shape related to electric fields, magnetic fields, and electromagnetic fields transmitted from a transmitter to a receiver without employing physical electromagnetic conductors. The wireless power may also be called a power signal and may indicate an oscillating magnetic flux enclosed by a primary and secondary coil. For example, this document describes power transformation of a system intended to charge devices such as a mobile phone, cordless phone, iPod, MP3 player, and headset wirelessly. In general, basic principles of wireless transfer of energy rely on both of magnetic inductive coupling and magnetic resonance coupling (namely, resonance induction). However, various frequencies of relatively high radiation levels, for example, below 135 kHz (LF) or above 13.56 MHz (HF) in which license-free operations are allowed may be utilized.

Figure 1:
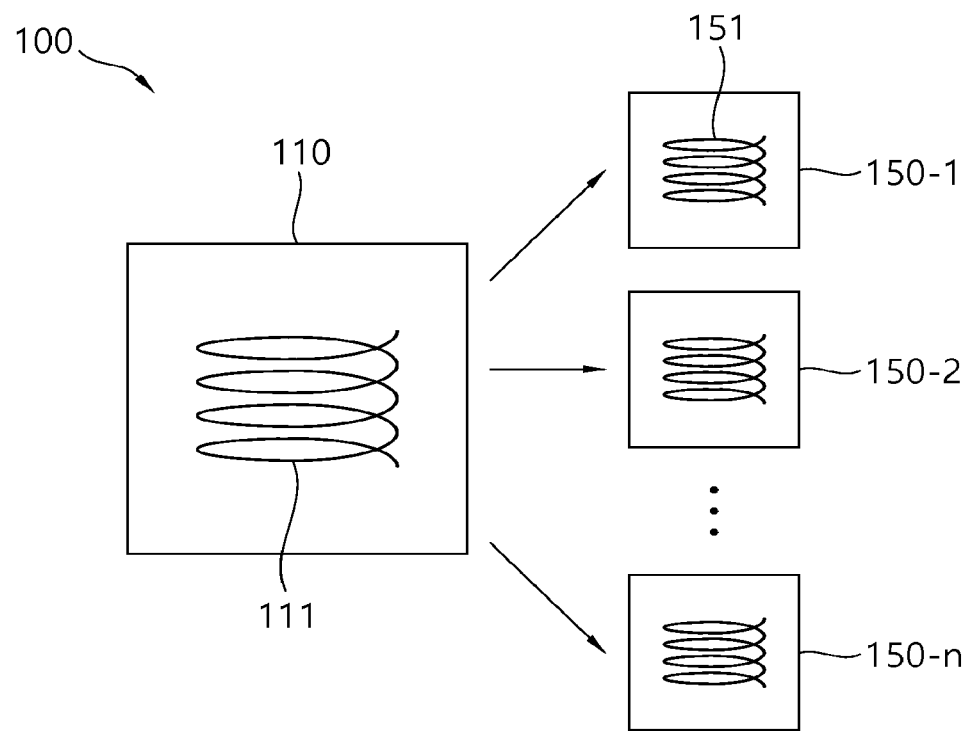
FIG. 1 is a block diagram illustrating constituting elements of a wireless power 20 transmission system according to an embodiment of the present invention.

FIG. 1 is a block diagram illustrating constituting elements of a wireless power 20 transmission system according to an embodiment of the present invention.

Referring to FIG. 1, a wireless power transmission system 100 includes a wireless power transmission device 110 and one wireless power reception device 150-1 or n wireless power reception devices 150-1 to 150-$n$.

The wireless power transmission device 110 includes a primary core block. The primary core block may include one or more primary coils 111. Although the wireless power transmission device 110 may have a predetermined appropriate shape, one preferred shape is a flat platform that has a power transmission surface and the respective wireless power reception devices 150-1 to 150-$n$ may be located on the platform or in a charging area (e.g., a charging pad) therearound.

The wireless reception devices 150-1 to 150-$n$ may be separated from the wireless power transmission device 110. When the respective wireless power reception devices 150-1 to 150-$n$ are positioned around the wireless power transmission device 110, the wireless reception devices 150-1 to 150-$n$ include a secondary core block coupled with the electromagnetic field generated by the first core block. The secondary core may include a core and one or more secondary coils 151.

The wireless power transmission device 110 transmits power to the wireless power reception devices 150-1 to 150-$n$ without a direct electrical contact. In this case, it is assumed that the primary core block and the secondary core block are magnetic induction coupled or resonance induction coupled with each other. The primary coil or the secondary coil may have predetermined appropriate forms, but may be, for example, a copper wire wound around a high permeable formation material such as ferrite or amorphous metal.

The wireless power reception devices 150-1 to 150-$n$ are generally connected to an external load (not illustrated, herein, referred to as an actual load of the wireless power reception device) to supply power wirelessly received from the wireless power transmission device 110 to the external load. For example, each of the wireless power reception devices 150-1 to 150-$n$ may consume power or carry the consumed power to a storage object like a portable electric, an electronic device, a rechargeable battery cell or a battery.

Figure 2:
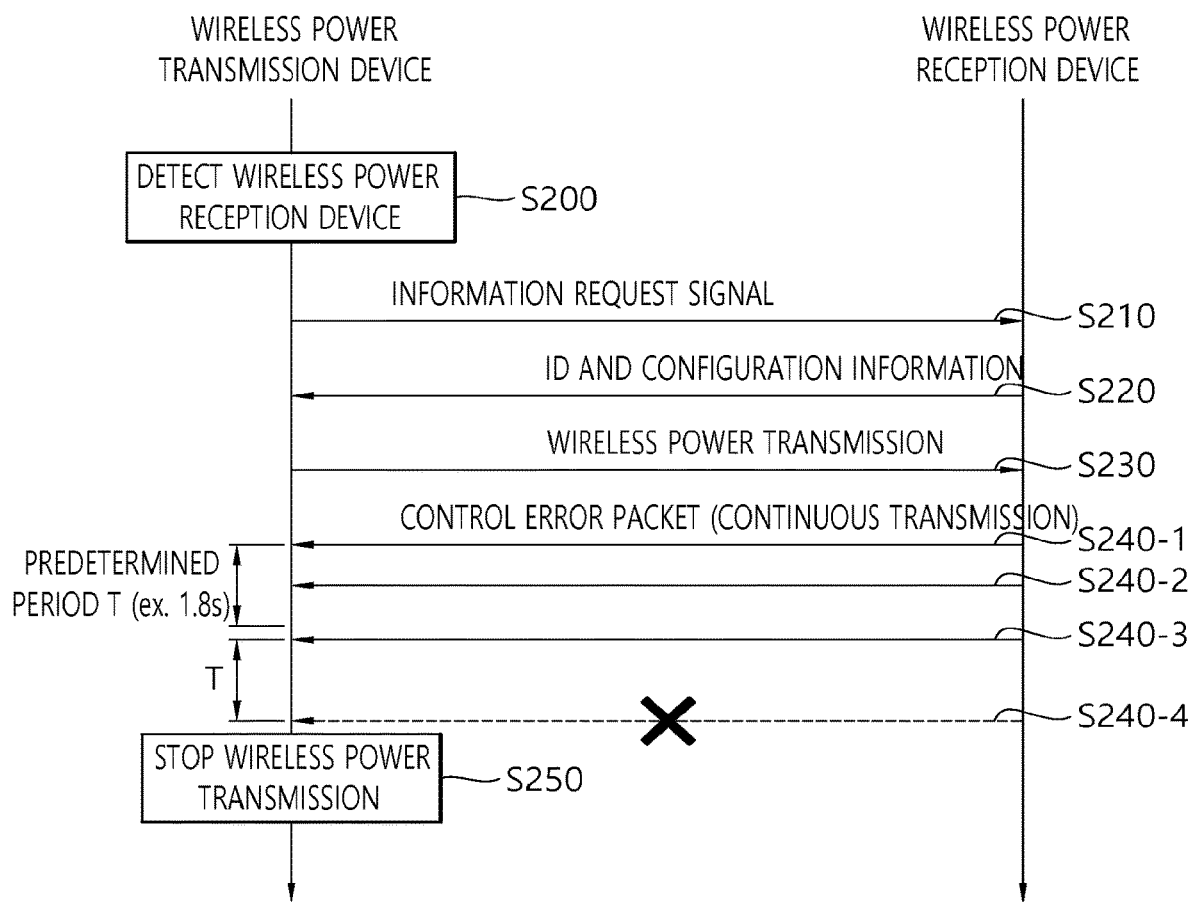
FIG. 2 illustrates an example of a wireless power transmission process.

FIG. 2 illustrates an example of a wireless power transmission process.

Referring to FIG. 2, a wireless power transmission device detects that a wireless power reception device is located in a charging area in a standby mode (step, S200). There may be various methods for detecting the wireless power reception device by the wireless power transmission device, and not limited to a specific method in the present invention. As an example, the wireless power transmission device may detect that the wireless power reception device is located in a charging area by periodically emitting analogue ping of a specific frequency, and based on detection current for this, resonance shift or capacitance change. As another example, when the wireless power transmission device periodically transmits a detection signal and the wireless power reception device transmits a response signal based on the detection signal, the wireless power transmission device may detect that the wireless power reception device is located in the charging area based on the response signal. As yet another example, when the wireless power transmission device periodically transmits a beacon, in response to this, the wireless power reception device transmits a searching signal or an advertisement to the wireless power transmission device, and therefore, the wireless power transmission device may detect the wireless power reception device.

As a preparation step for a wireless power transmission, the wireless power transmission device transmits an information request signal to the wireless power reception device (step, S210). Here, the information request signal may be a signal for requesting an ID and request power information of the wireless power reception device. As an example, the information request signal may be transmitted in a form of data packet message. As another example, the information request signal may be transmitted in a form of digital ping according to a predefined standard between the wireless power transmission device and the wireless power reception device.

In response to the information request signal, the wireless power reception device transmits the ID and configuration information to the wireless power transmission device (step, S220). Here, the configuration information may include a maximum amount of power that is provided for the wireless power reception device.

Based on the ID and configuration information, the wireless power transmission device configures parameters for power transmission and performs a wireless power transmission to the wireless power reception device (step, S230). That is, the wireless power transmission device creates a power transmission contract based on the ID and the configuration information and performs a wireless power transmission to the wireless power reception device. The process, performed by the wireless power transmission device, from the start to the end of the wireless power transmission to the wireless power reception device may be called a (wireless) power transfer phase.

The wireless power reception device may provide the received wireless power to an external load such as a battery.

The wireless power transmission device monitors the parameters for power transmission and may abort the wireless power transmission when any one of the parameters exceeds a stated limit.

Alternatively, the wireless power transmission process of step S230 may be expired by the request of the wireless power reception device. For example, the wireless power reception device may transmit a signal for requesting termination of the wireless power transmission to the wireless power transmission device, when a battery is fully charged.

Meanwhile, after step, S230, the wireless power reception device continuously transmits a control error packet (CEP) periodically or aperiodically to the wireless power transmission device (steps, S240-1, S240-2 and S240-3). This is performed for controlling an amount of power which is transmitted from the wireless power transmission device to the wireless power reception device, that is, to perform a power control. The power control processes like steps S240-1 to S240-3 may include the power control process according to the embodiments of FIGS. 3 to 5.

Figure 3:
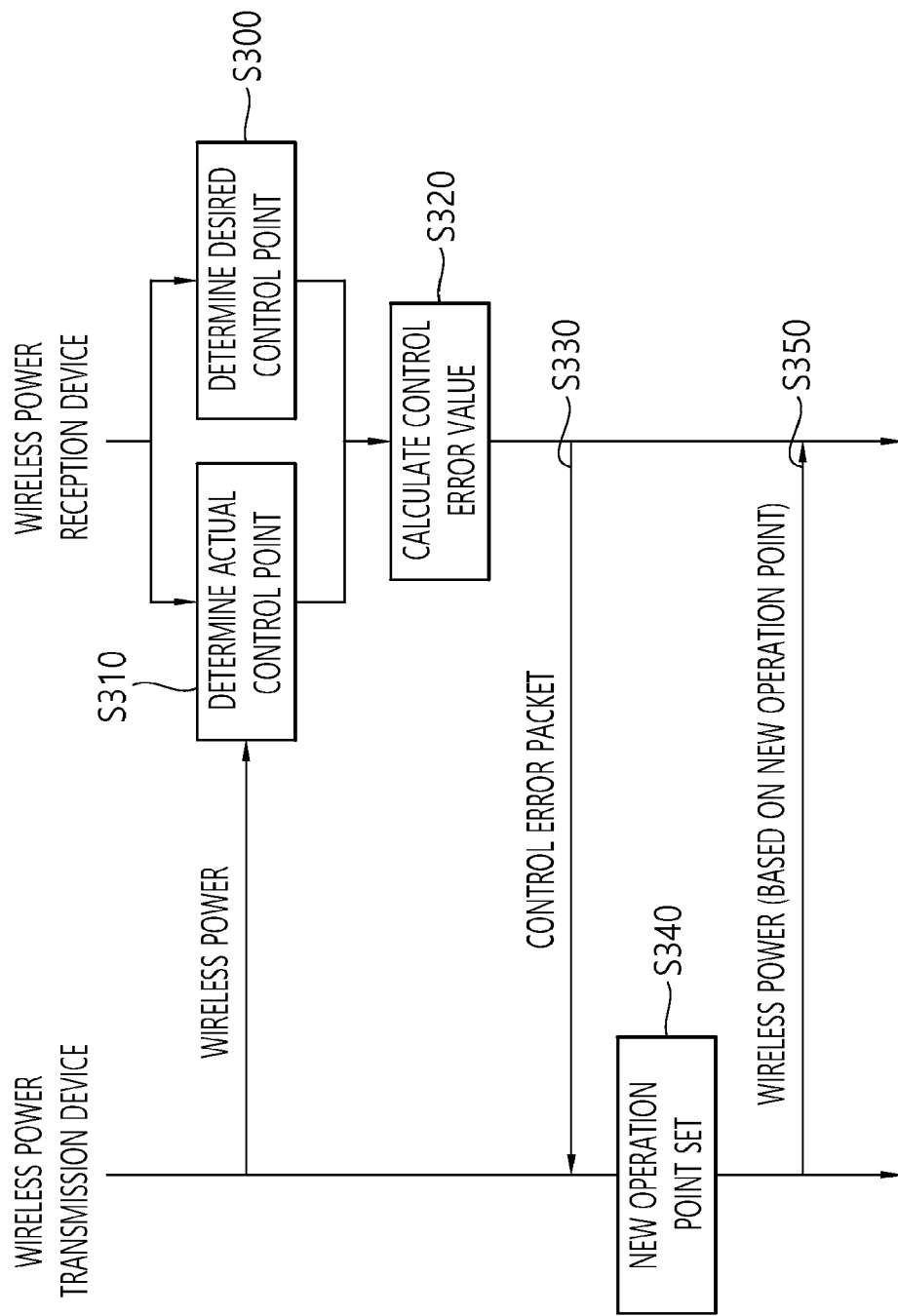
FIG. 3 illustrates an example of a power control process performed between a wireless power transmission device and a wireless power reception device.

FIG. 3 illustrates an example of a power control process performed between a wireless power transmission device and a wireless power reception device.

Referring to FIG. 3, the wireless power reception device selects a desired control point (step, S300). Here, the control point may include current and/or voltage, a temperature of a part of the wireless power reception device, and so on.

The wireless power reception device determines an actual control point based on the wireless power received from the wireless power transmission device (step, S310).

The wireless power reception device calculates a control error value using the desired control point and the actual control point (step, S320). For example, the wireless power reception device may calculate the control error value through the (relative) difference between a desired voltage (or current) and an actual voltage (or current).

The wireless power reception device generates a control error packet based on the control error value and transmits this to the wireless power transmission device (step, S330).

The wireless power transmission device set a new operation point based on the control error packet, if it is required (step, S340). Here, for example, the operation point may be at least one of amplitude, a frequency and a duty cycle of an AC voltage applied to a primary coil.

The wireless power transmission device performs a wireless power transmission to the wireless power reception device based on the new operation point (step, S350). In this case, the wireless power transmission device may maintain the operation point until a new control error packet is received from the wireless power reception device.

Referring to FIG. 2 again, in the case that a control error packet is not received within a predetermined period T (e.g., 1.8 sec) after the control error packet is received like step S240-4, the wireless power transmission device determines that the wireless power reception device is removed from the charging area, and stops the wireless power transmission (step, S250). This is because it is required to stop the wireless power transmission even in the case that a user removes the wireless power reception device that receives the wireless power from the charging area at any time in addition to an excess of predetermined limit of the parameter described above and a battery fully charged state.

However, when the wireless power reception device performs a battery charge through the wireless power reception, in the case of light load state in the wireless power reception device and/or the battery, a distortion may occur in the packet transmitted to the wireless power transmission device from the wireless power reception device. For example, while the battery connected (or provided) to the wireless power reception device is charging, in some cases, owing to a fluctuation of load, the case that charge currents are irregularly changed may happen. In this case, the packet transmitted from the wireless power reception device may be distorted. In such a case, although the wireless power reception device is located in a charging area, a problem occurs that the charger determines the terminal to be removed from the charging area and terminates the power transmission. This may cause unnecessary interruption of the wireless power transmission, which becomes a problem of delaying a battery charging.

Figure 4:
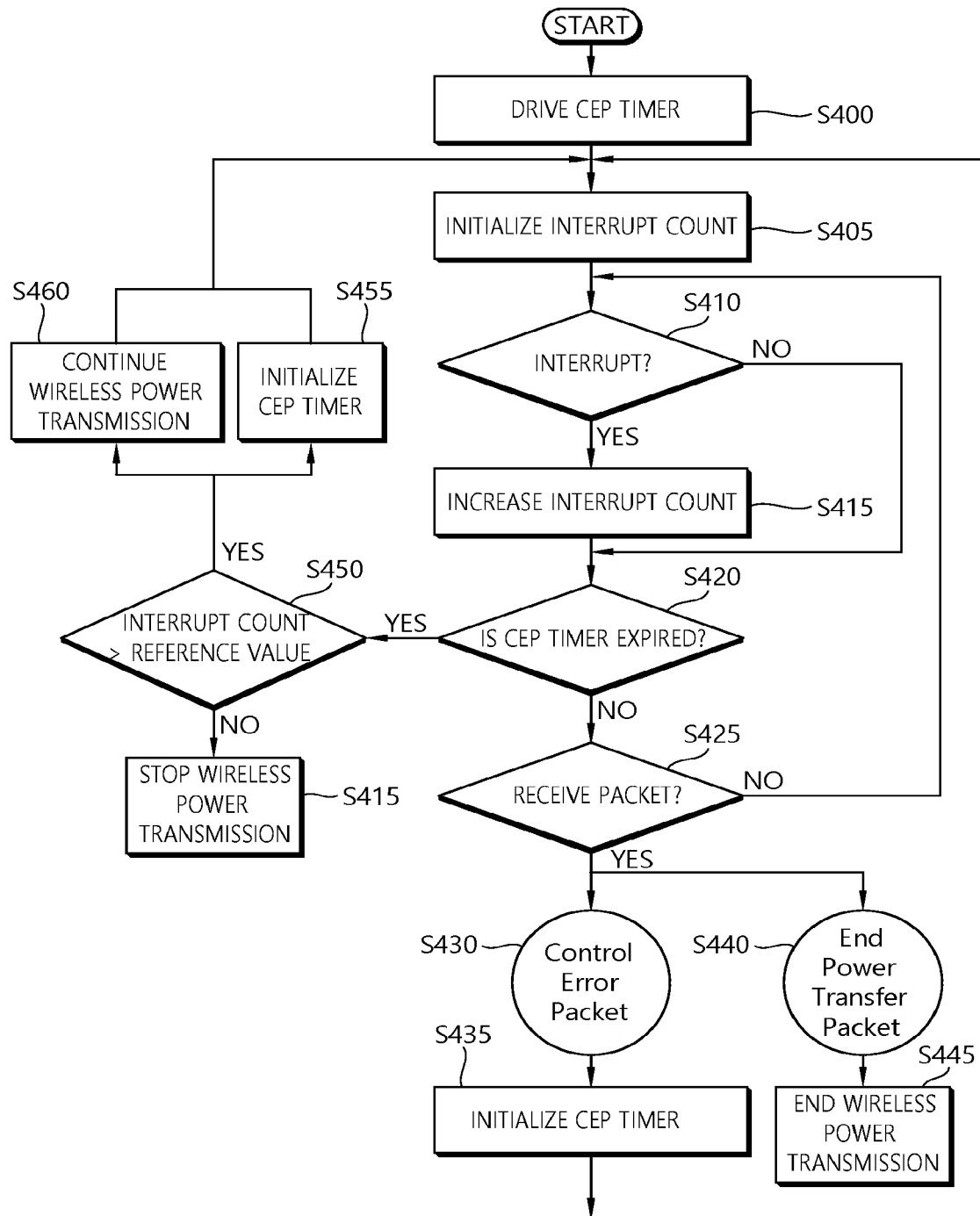
FIG. 4 is a flowchart illustrating an example of a method for performing a power control by a wireless power transmission device in a wireless power transmission system according to the present invention.

FIG. 4 is a flowchart illustrating an example of a method for performing a power control by a wireless power transmission device in a wireless power transmission system according to the present invention. FIG. 4 corresponds to the process after the processes including step S230 of FIG. 2.

Referring to FIG. 4, the wireless power transmission device drives a control error packet (CEP) timer (step, S400). This is performed for checking whether the wireless power transmission device receives the CEP within a predetermined time in a power transmission phase. The timer may be set to the predetermined period T described in FIG. 2. In this case, the timer may be set to, for example, 1.8 sec.

The wireless power transmission device initializes an interrupt count (step, S405). The wireless power transmission device operates a decoding algorithm in order to decode the message transmitted from a wireless power reception device, and when a reception wave form is received from the wireless power reception device, an interrupt is generated for decoding. Particularly, when a wave form is applied to an interrupt port of a machine control unit (MCU) provided in the wireless power transmission device, regardless of a normal wave form or an abnormal wave form (e.g., impulse-noise), the interrupt is generated on a rising edge and a falling edge of the wave form, and the interrupt count increases whenever the interrupt is generated.

When the interrupt count is initialized, the wireless power transmission device checks whether the interrupt is generated (step, S410). For example, in the case that the wireless power transmission device receives the CEP packet, about 66 counts of interrupts may be counted per CEP packet. Since one CEP packet includes a header, a message and a checksum field of 1 byte each, and a start bit, a parity bit and a stop bit may be added to each field, one CEP packet may include total 33 bits. In addition, since the interrupt may be generated each of the rising edge and the falling edge of the wave form, 66 counts of interrupt may be generated for the 33 bits.

In the case that an interrupt is generated in step S410, the wireless power transmission device increases the interrupt count (step, S415), and checks whether the CEP timer is expired (or time out) (step, S420). Herein, as described above, the CEP timer has a value of T.

In the case that an interrupt is not generated in step S410, the wireless power transmission device checks whether the CEP timer is expired without increasing the interrupt count (step, S420).

In the case that the CEP timer is not expired in step S420, the wireless power transmission device checks whether there exists a message packet received from the wireless power reception device (step, S425).

In the case that there is no message packet which is received in step S425, the wireless power transmission device returns to step S410.

In the case that there is a message packet received in step S425 and the packet is the control error packet (CEP) (step, S430), the wireless power transmission device performs the power control if it is required, and initializes the CEP timer (step, S435), and then returns to step S405 again.

In the case that there is a message packet received in step S425 and the packet is an end power transfer packet (step, S440), the wireless power transmission device may end the wireless power transmission (step, 445). Herein, the end power transfer packet may include information that indicates a reason why requesting the end of wireless power transmission, for example, charge complete, over temperature, over voltage or over current, and the like.

Meanwhile, in the case that the CEP timer is expired in step S420, the wireless power transmission device checks whether the interrupt count exceeds a reference value (step, S450). This is designed for determining whether the wireless power reception device is removed from the charging area based on the interrupt count value. Here, the reference value may be set to, for example, 500. In this case, in the case that the interrupt count value exceeds the reference value 500, the wireless power transmission device may determine that the wireless power reception device is still located in the charging area, although the CEP timer is expired.

In the case that the interrupt count exceeds the reference value in step S450, the wireless power transmission device determines that the wireless power reception device is located in the charging area, initializes the CEP timer (step, S455), and continues the wireless power transmission (S460), and then returns to step S405.

In the case that interrupt count does not exceed the reference value in step S450, the 25 wireless power transmission device determines that the wireless power reception device is removed from the charging area, and stops the wireless power transmission (step, S465).

According to the method described above, although the CEP packet is transmitted from the wireless power reception device for a predetermined period, the wireless power transmission device additionally may determine whether the wireless power reception device is located in the charging area, and perform the charging continuously. In this case, even in the case that a distortion occurs in the packet transmitted to the wireless power transmission device from the wireless power reception device since a serious load fluctuation such as a light load state of the wireless power reception device occurs in the wireless power reception device and/or the battery temporally, unnecessary interruption of wireless power transmission may be prevented, and the battery may be rapidly charged.

Meanwhile, when dividing the predetermined period T for the CEP timer into n equal parts, the power control operation performed for each section of n according to the present invention may be represented as follows.

Figure 5:
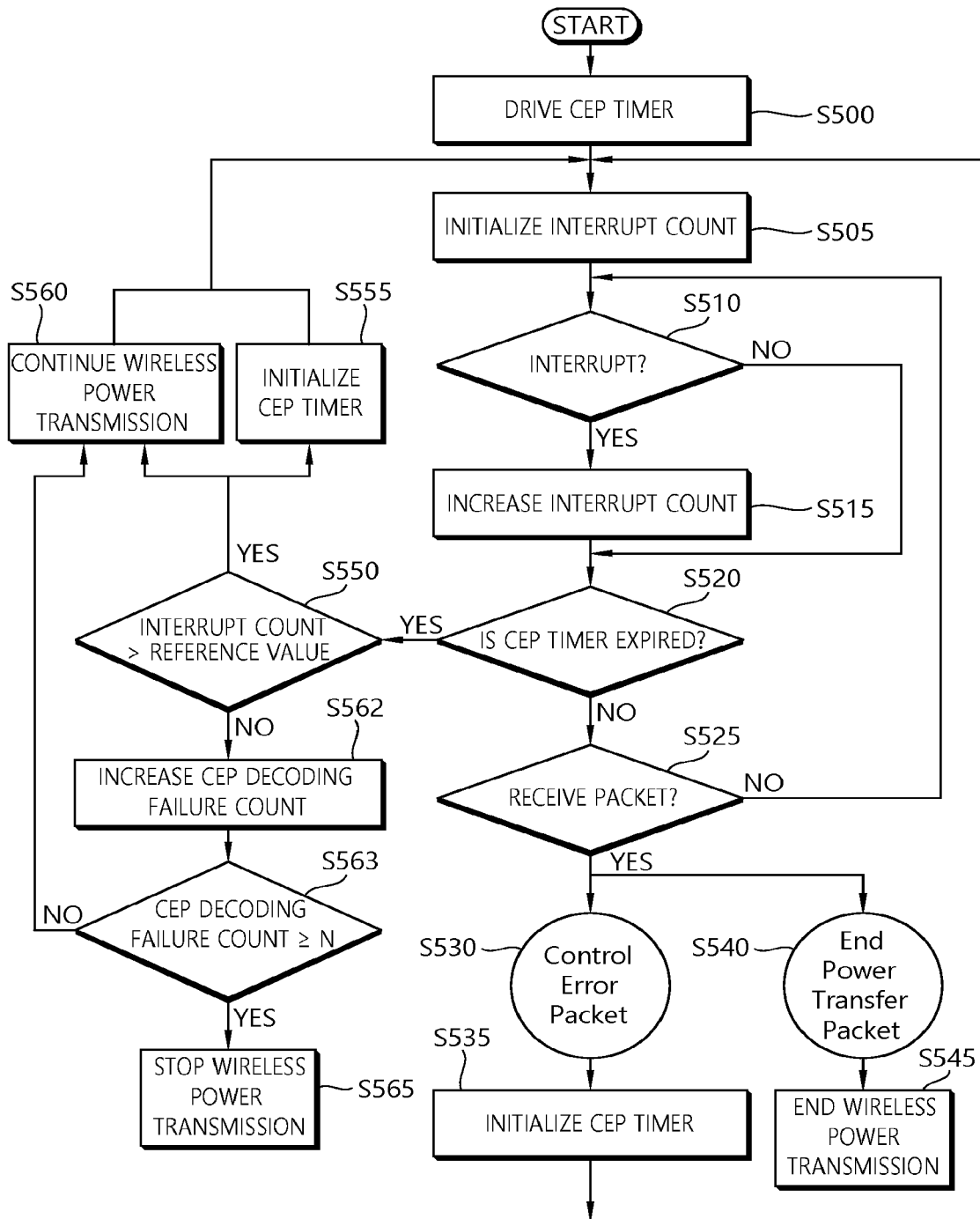
FIG. 5 is a flowchart illustrating another example of a method for performing a power control by a wireless power transmission device in a wireless power transmission system according to the present invention.

FIG. 5 is a flowchart illustrating another example of a method for performing a power control by a wireless power transmission device in a wireless power transmission system according to the present invention.

Referring to FIG. 5, the wireless power transmission device drives the CEP timer (step, S500). The timer may be set to a value of dividing the predetermined period T shown in FIG. 2 into n equal parts (i.e., T/n). For example, in the case that n=5 and T is 1.8 sec, 20 the CEP timer may be set to 360 ms.

The wireless power transmission device initializes an interrupt count (step, S505).

The wireless power transmission device checks whether the interrupt is generated (step, S510).

In the case that an interrupt is generated in step S510, the wireless power 25 transmission device increases the interrupt count (step, S515), and checks whether the CEP timer is expired (or time out) (step, S520). Herein, as described above, the CEP timer has a value of T/n.

In the case that an interrupt is not generated in step S510, the wireless power transmission device checks whether the CEP timer is expired without increasing the interrupt count (step, S520).

Meanwhile, in the case that the CEP timer is expired in step S520, the wireless power transmission device checks whether the interrupt count exceeds a reference value (step, S550). Here, the reference value may be set to, for example, 100.

In the case that the interrupt count exceeds the reference value in step S550, the wireless power transmission device determines that the wireless power reception device is located in the charging area, initializes the CEP timer (step, S555), and returns to step S505 in the state of continuing the wireless power transmission (S560).

In the case that the interrupt count does not exceed the reference value in step S550, the wireless power transmission device increases a CEP decoding failure count (step, S562). Herein, the CEP decoding failure count represents a count of continuous sections in which the CEP decoding is failed, and the interrupt is the reference value or lower, among the sections of n counts. That is, in the case that it is detected that the CEP decoding is failed and the interrupt is the reference value or lower for all sections of n counts, it may be determined that the wireless power transmission device fails to receive the CEP during the predetermined period T. In this case, it may be determined that the wireless power reception device is removed from the charging area.

The wireless power transmission device checks whether the CEP decoding failure count equals to n or is greater than n (step, S563).

In the case that the CEP decoding failure count is less than n in step S563, the wireless power transmission device initializes the CEP timer (step, S555), and then returns to step S505.

In the case that the CEP decoding failure count equals to n or is greater than n in step S563, the wireless power transmission device determines that the wireless power reception device is removed from the charging area, and stops the wireless power transmission (step, S565).

The rest of the steps S525, S530, S535, S540 and S545 are the same as the processes of FIG. 4.

Figure 6:
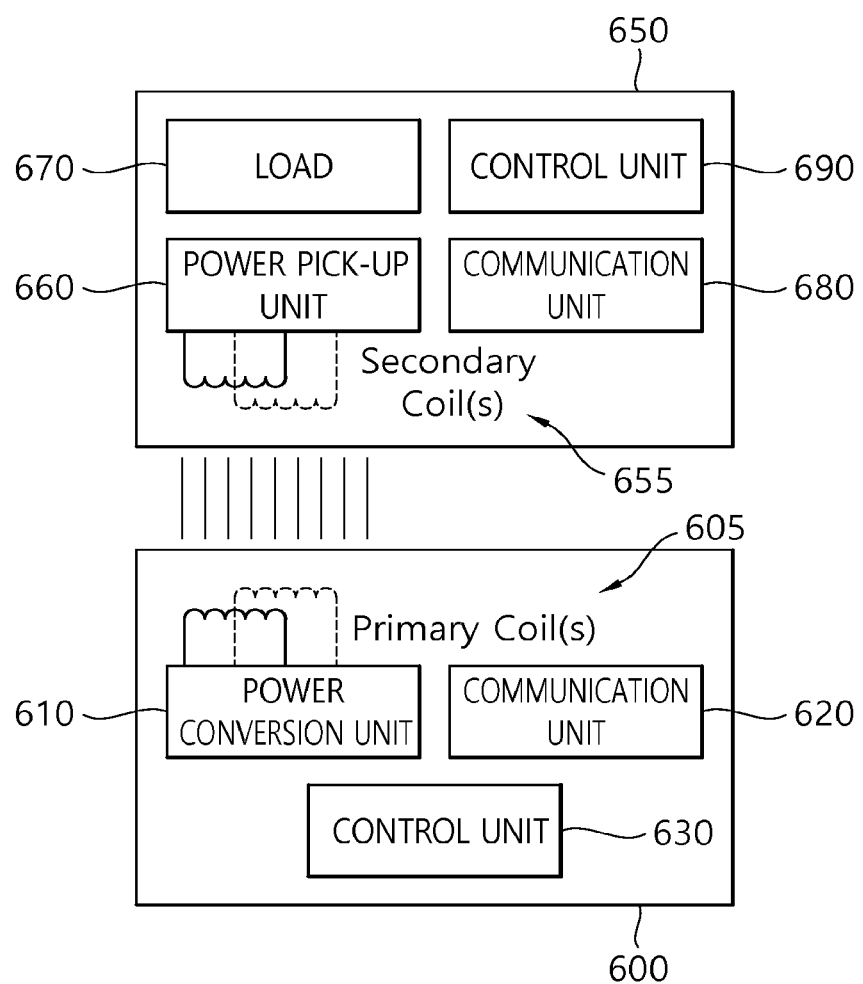
FIG. 6 is an example of block diagram illustrating a wireless power transmission device and a wireless power reception device according to the present invention.

FIG. 6 is an example of block diagram illustrating a wireless power transmission device and a wireless power reception device according to the present invention.

Referring to FIG. 6, a wireless power transmission device 600 includes at least one primary coil 605, a power conversion unit 610 configured to apply electric driving signals to the primary coil 605 in order to generate electromagnetic field with being connected to the primary coil 605, a communication unit 620 and a control unit 630.

Although the wireless power transmission device 600 may have predetermined appropriate shape, one preferred shape is a flat platform that has a power transmission surface and each of the respective wireless power reception devices 650 may be located on the platform or in a charging area therearound.

The power conversion unit 610 may be a half-bridge inverter or a full-bridge inverter. The power conversion unit 610 may control frequency, duty cycle, magnitude of the electric driving signal which is applied to the primary coil 605 by switching.

The communication unit 620 controls a communication between the wireless power transmission device 600 and the wireless power reception devices 650. As an example, the communication unit 620 may perform a communication with the wireless power reception devices 650 through the primary coil 605. As another example, the communication unit 620 may perform a communication with the wireless power reception devices 650 through a separate radio frequency (RF) communication means provided in each of the communication unit 620 and the communication unit 680.

The communication unit 620 may receive an ID, configuration information, a CEP, or an end power transfer packet, etc. from the wireless power reception devices 650.

The control unit 630 generates a control signal for power control based on the ID, the configuration information, the CEP or the end power transfer packet, etc., and transmits the control signal to the power conversion unit 610.

The control unit 630 may perform control operations required to implement the present invention described above.

The control unit 630 may initialize and drive the CEP timer. Herein, the CEP timer may be set to the value of the reference time T or T/n.

The control unit 630 may initialize and measure the interrupt count, which is related to the interrupt generated when decoding a wave form in which the communication unit 620 is received.

The control unit 630 performs the power control according to the present invention based on the CEP timer and the interrupt count.

As an example, when the CEP timer (e.g., T) is expired, the control unit 630 may compare the interrupt count and the reference value on the time when the CEP timer is expired.

In the case that the interrupt count is greater than the reference value, although the CEP timer is expired, the control unit 630 may determine that the wireless power reception device 650 is still located in the charging area of the wireless power transmission device 600, and may continue the wireless power transmission through the primary coil 605.

As another example, in the case that the CEP timer is not greater than the reference value, according to the termination of the CEP timer, the control unit 630 may determine that wireless power reception device 650 is removed from the charging area, and may stop the wireless power transmission through the primary coil 605.

As yet another example, when the CEP timer (e.g., T) is expired, the control unit 630 may compare the interrupt count and the reference value on the time when the CEP timer is expired. In the case that the interrupt count is greater than the reference value, the control unit may increase the CEP decoding failure count. And in case that the CEP decoding failure count is equal to or greater than n, the control unit 630 may determine that wireless power reception device 650 is removed from the charging area, and may stop the wireless power transmission through the primary coil 605.

The wireless power reception device 650 may be detachable from the wireless power transmission device 600, and may include at least one secondary coil 655 coupled with the electromagnetic field generated by the wireless power transmission device 600, when the wireless power reception device 650 is located in the charging area of the wireless power transmission device 600. In this mode, power may be transferred to the wireless power reception device 650 from the wireless power transmission device 600 without direct electrical contact. The wireless power reception device 650 includes a load 670, a power pick-up unit 660 configured to collect power with being connected to the secondary coil 655 and provide power to the load 670, a communication unit 680 and a control unit 690.

The communication unit 680 controls a communication between the wireless power transmission device 600 and the wireless power reception devices 650. As an example, the communication unit 680 may perform a communication with the wireless power transmission device 600 through the secondary coil 655. As another example, the communication unit 620 and the communication unit 680 may be provided with separate RF communication means, and the communication unit 680 may also perform a communication with the wireless power transmission device 600 through the RF communication means.

The communication unit 680 may transmit an ID, configuration information, a CEP or an end power transfer packet, etc. to the wireless power transmission device 600.

The control unit 690 performs a serious of controls such that wireless power of an appropriate level is received in the wireless power reception devices 650.

All of the functions may be performed by a processor such as a microprocessor according to software or program code which is coded to perform the functions, a controller, a microcontroller, an application specific integrated circuit (ASIC). The design, development and implementation of the code may be apparent to a skilled person in the art based on the description of the present invention.

Although the present invention is described so far by reference to the embodiments, it will be understood to those skilled in the art that various modifications and variations can be made without departing from the spirit or scope of the inventions. Therefore, the present invention is not limited to the embodiments described above, but the present invention includes all embodiments within the range of the attached claims and the equivalence.

The invention claimed is:

1. A wireless power transmission device comprising:
   at least one primary coil configured to transmit wireless power to a wireless power reception device; and
   a communication unit configured to receive control data from the wireless power reception device via the primary coil; and
   a control unit configured to:
      control a transmission of the wireless power to the wireless power reception device based, at least in part, on the control data received from the wireless power reception device, and
      set an operation point for the transmission of the wireless power via the primary coil based, at least in part, on a control error value when the control data comprises a control error packet (CEP) that includes the control error value.

2. The wireless power transmission device of claim 1, wherein the control error value is received in the CEP from the wireless power reception device.

3. The wireless power transmission device of claim 2, wherein the CEP is received via a received signal from the wireless power reception device, the wireless power transmission device further comprising:
   the control unit configured to reset a CEP timer when the communication unit receives the CEP and to count an interrupt generated when decoding the received signal,
   the control unit configured to control or stop the transmission of the wireless power to the wireless power reception device based on the CEP timer and the interrupt count.

4. The wireless power transmission device of claim 3, wherein the CEP timer indicates whether the CEP is received within a predetermined period.

5. The wireless power transmission device of claim 3,
   wherein the control unit stops the transmission of the wireless power when the CEP timer is expired and the interrupt count is not greater than a reference value,
   wherein the control unit continues the transmission of the wireless power and resets the CEP timer when the CEP timer is expired and the interrupt count is greater than the reference value, and
   wherein the control unit increases a CEP decoding failure count when the CEP timer is expired and the interrupt count is not greater than the reference value.

6. The wireless power transmission device of claim 1, wherein the control unit is further configured to:
   end the transmission of the wireless power via the primary coil when the control data comprises an end power transfer packet.

7. The wireless power transmission device of claim 6, wherein the end power transfer packet includes information that indicates a reason for requesting an end of the transmission of the wireless power.

8. The wireless power transmission device of claim 7, wherein the reason includes at least one of charge complete, over temperature, over voltage, or over current.

9. A method performed by a wireless power transmission device, the method comprising:
   transmitting wireless power to a wireless power reception device via at least one primary coil; and
   receiving control data from the wireless power reception device via the primary coil;
   controlling a transmission of the wireless power to the wireless power reception device based, at least in part, on the control data received from the wireless power reception device; and
   setting an operation point for the transmission of the wireless power via the primary coil based, at least in part, on a control error value when the control data comprises a control error packet (CEP) that includes the control error value.

10. The method of claim 9, wherein the control error value is received in the CEP from the wireless power reception device.

11. The method of claim 10, wherein the CEP is received via a received signal from the wireless power reception device, the method further comprising:
   resetting a CEP timer when the wireless power transmission device receives the CEP and counting an interrupt generated when decoding the received signal; and
   controlling or stopping the transmission of the wireless power to the wireless power reception device based on the CEP timer and the interrupt count.

12. The method of claim 11, wherein the CEP timer indicates whether the CEP is received within a predetermined period.

13. The method of claim 11, wherein controlling or stopping the transmission of the wireless power includes:
   stopping the transmission of the wireless power when the CEP timer is expired and the interrupt count is not greater than a reference value;
   continuing the transmission of the wireless power and resetting the CEP timer when the CEP timer is expired and the interrupt count is greater than the reference value; and
   increasing a CEP decoding failure count when the CEP timer is expired and the interrupt count is not greater than the reference value.

14. The method of claim 9, further comprising:
   ending the transmission of the wireless power via the primary coil when the control data comprises an end power transfer packet.

15. The method of claim 14, wherein the end power transfer packet includes information that indicates a reason for requesting an end of the transmission of the wireless power.

16. The method of claim 15, wherein the reason includes at least one of charge complete, over temperature, over voltage, or over current.

* * * * *